United States Patent [19]
Freeman et al.

[11] Patent Number: 5,910,531
[45] Date of Patent: Jun. 8, 1999

[54] DETERGENT AND DISPERSANT COMPOSITIONS FROM HIGH TEMPERATURE POLYMERIZATION PRODUCTS

[75] Inventors: Michael Bennett Freeman, Harleysville; Gary Robert Larson, Hatfield; Richard Foster Merritt, Fort Washington, all of Pa.; Yi Hyon Paik, Princeton, N.J.; Jan Edward Shulman, Newtown, Pa.; Graham Swift, Blue Bell, Pa.; Robert Wilczynski, Yardley, Pa.

[73] Assignee: Rohm and Haas Company, Philadelphia, Pa.

[21] Appl. No.: 08/798,145

[22] Filed: Feb. 10, 1997

Related U.S. Application Data

[60] Continuation of application No. 08/467,686, Jun. 6, 1995, abandoned, which is a division of application No. 08/258,300, Jun. 13, 1994, abandoned.

[51] Int. Cl.$^6$ ................ C08K 5/00; C11D 3/37
[52] U.S. Cl. .......... 524/556; 252/174.24; 524/547; 524/558; 524/559
[58] Field of Search ............ 252/174.24, 174.23; 524/547, 556, 558, 559; 526/240

[56] References Cited

U.S. PATENT DOCUMENTS

| | | |
|---|---|---|
| 3,074,999 | 1/1963 | Rauhut et al. . |
| 3,087,962 | 4/1963 | Bortnick . |
| 3,227,745 | 1/1966 | McClure . |
| 3,342,853 | 9/1967 | Nemec . |
| 3,342,854 | 9/1967 | Nemec . |
| 3,379,702 | 4/1968 | Spivey . |
| 4,158,736 | 6/1979 | Lewis et al. ............... 526/329.2 |
| 4,196,272 | 4/1980 | Goretta . |
| 4,246,370 | 1/1981 | Lewis et al. ............... 525/131 |
| 4,301,266 | 11/1981 | Muenster et al. . |
| 4,314,044 | 2/1982 | Hughes et al. . |
| 4,356,288 | 10/1982 | Lewis et al. ............... 525/308 |
| 4,414,370 | 11/1983 | Hamielec . |
| 4,529,787 | 7/1985 | Schmidt et al. . |
| 4,546,160 | 10/1985 | Brand et al. . |
| 4,600,755 | 7/1986 | Das et al. . |
| 4,774,303 | 9/1988 | Denzinger et al. . |
| 4,914,167 | 4/1990 | Hambrecht et al. . |
| 5,028,677 | 7/1991 | Janowicz ............... 526/329.7 |
| 5,055,540 | 10/1991 | Hughes et al. . |
| 5,264,530 | 11/1993 | Darmon et al. . |
| 5,268,437 | 12/1993 | Holy et al. . |
| 5,328,972 | 7/1994 | Dada ............... 526/227 |
| 5,374,687 | 12/1994 | Cooperman et al. . |
| 5,576,386 | 11/1996 | Kempter et al. . |

FOREIGN PATENT DOCUMENTS 96459  12/1983  European Pat. Off. .

OTHER PUBLICATIONS

"Continuous Polymerization and Copolymerization of Acrylic Acid with Styrene at High Temperatures", T. Spychaj, Scientific Papers of Szczecin Polytechnic No. 401, Institute of Chemical Technology (1989).

"High–Temperature Continuous Bulk Copolymerization of Styrene and Acrylic Acid: Thermal Behavior of the Reactants", T. Spychaj, et l., Journal of Applied Science, vol. 41, pp. 2111–2119 (1991).

"Base–Catalyzed Oligomerization of Vinyl Monomers–III", B.A. Feit, European Polymer Journal, vol. 8, pp. 321–328 (1972).

"Anionic Oligomerization of Acrylic Esters", B.A. Feit, European Polymer Journal, vol. 3, pp. 523–534 (1967).

"Thermal Organic Reactions in Supercritical Fluids", J. Metzger, et al., Chemical Engineering at Supercritical Fluid Conditions, pp. 515–533 (1983).

"Low Molecular Weight Polymers of Acrylic Acid and Copolymers with Styrene", T. Spychaj, Progress in Organic Coatings, vol. 17, pp. 71–88 (1989).

"Solvent/Nonsolvent Solubility and Polarity Parameters in Fractional Separation of Oligomers", T. Spychaj and A.E. Hamielec, Die Angewandte Makromolekulare Chemie, vol. 157, pp. 137–151 (1988).

"Handbook of Polyolefins Synthesis and Properties", Cornelia Vasile, Raymond B. Seymour, Marcel Deklker, Inc., New York, p. 526,527.

*Primary Examiner*—Christopher Henderson

[57] ABSTRACT

High temperature polymerization process and products obtained therefrom are provided. The polymerization is conducted at above 225° C. to produce polymers having a degree of polymerization below 50. The products are useful as detergent additives and for subsequent polymerization.

4 Claims, No Drawings

DETERGENT AND DISPERSANT COMPOSITIONS FROM HIGH TEMPERATURE POLYMERIZATION PRODUCTS

This is a continuation of application Ser. No. 08/467,686, filed Jun 6, 1995 now abandoned which is a divisional of application Ser. No. 08/258,300, filed Jun. 13, 1994, abandoned.

This invention relates to a DETERGENT AND DISPERSANT COMPOSITIONS FROM high temperature polymerization products. In particular, this invention relates to a high temperature polymerization process to produce oligomers. More particularly, this invention relates to a high temperature polymerization process to produce terminally unsaturated oligomers. Oligomers, as used herein and in the appended claims, refers to polymers having degree of polymerization of below 50.

Low molecular weight polymers are known to be useful detergent additives, anti-redeposition agents, hard surface cleaners, scale inhibitors, pigment dispersants, mineral dispersants, clay dispersants, water treatment additives and the like. However, production of very low molecular weight polymers of carboxylic monomers, especially acrylic acid, has proven to be a difficult task.

In certain applications, such as detergent additives, it is becoming increasingly important that the carboxylic acid polymers are biodegradable. It is known that biodegradability increases as molecular weight decreases. Therefore, processes which produce very low molecular weight polymers may provide routes to biodegradable polymer products.

The art has long sought an inexpensive, efficient and environmentally sound way to produce low molecular weight polymers.

One method of achieving low molecular weight polymers is through the use of efficient chain transfer agents, but this approach has several drawbacks. This approach incorporates the structure of the chain transfer agent into the polymer chain. This can be undesirable since that structure will have an increasing effect on the properties of the polymer as molecular weight decreases. Furthermore, the chain transfer agents commonly employed are mercaptans. These materials are expensive and have objectionable odors associated with their presence. Other common chain transfer agents are hypophosphites, bisulfites and alcohols. These also add to the cost of the process, impart functionality to the polymer, can introduce salts into the product, and may necessitate a product separation step.

Another way of lowering the molecular weight of the polymers produced is by increasing the amount of initiator. This approach adds considerably to the cost of production and may result in polymer chain degradation, crosslinking, and high levels of unreacted initiator remaining in the product. In addition, high levels of initiator may also result in high levels of salt by-products in the polymer mixture which is known to be detrimental to performance in many applications. The same is true for chain stopping agents such as sodium metabisulfite. Among the preferred free-radical initiators for aqueous polymerization is hydrogen peroxide. It is relatively inexpensive, has low toxicity, and does not produce detrimental salt by-products. However, hydrogen peroxide does not generally decompose efficiently at conventional polymerization temperatures and large amounts must normally be used to generate enough radicals to carry out a polymerization.

High levels of metal ions together with high levels of initiator have also been tried as a means for controlling molecular weight. Such an approach is unsuitable for some products, such as water treatment polymers, which cannot tolerate metal ion contaminants in the polymer product. In addition, depending on the metal ions used, the product may be discolored due to the presence of the metal ions.

In the European Polymer Journal, 1972, Vol. 8, pp. 321–328, Feit describes a multistep synthesis technique for preparing terminally unsaturated oligomers. The process described therein requires a base-catalyzed addition of an acetic acid ester derivative to an activated olefin, followed by hydrolysis of one ester group, followed by a Mannich reaction to introduce a terminal double bond. This three step process is repeated to prepare a terminally unsaturated oligomer with one additional mer. This process suffers the drawback of being fairly complex, expensive and time-consuming.

The present invention seeks to overcome the problems associated with the previously known methods for preparing terminally unsaturated oligomers.

In a first aspect of the present invention, there is provided a terminally unsaturated oligomer of the formula:

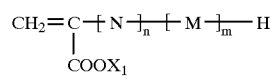

(I)

wherein N is a residue of the formula

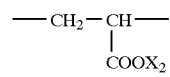

wherein $X_1$ and $X_2$ are independently selected from the group consisting of H, $NH_4$, alkali metals and alkaline earth metals;

wherein M is the residue of a monoethylenically unsaturated monomer;

wherein m is 0 to 47;

wherein n is 2 to 50;

and wherein the sum of n and m is less than or equal to 50.

It is understood that the N and M residues in the terminally unsaturated oligomer may be randomly arranged. In other words, adjacent the terminally unsaturated moiety may be either an N or an M residue; the residue adjacent the residue adjacent the terminally unsaturated moiety may be either an N or an M residue, and so on.

In a second aspect of the present invention, there is provided an oligomer mixture, comprising:

(a) from 5 to 95 percent by weight of the oligomer mixture of terminally unsaturated oligomers of the formula:

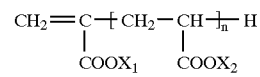

wherein $X_1$ and $X_2$ are independently selected from the group consisting of H, $NH_4$, alkali metals and alkaline earth metals;

wherein n is 1;

(b) from 5 to 95 percent by weight of the oligomer mixture of terminally unsaturated oligomers of the formula:

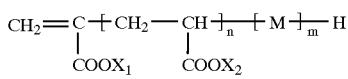

wherein $X_1$ and $X_2$ are independently selected from the group consisting of H, $NH_4$, alkali metals and alkaline earth metals;

wherein M is the residue of a monoethylenically unsaturated monomer;

wherein m is 0 or 1;

wherein n is 1 or 2;

and wherein the sum of n and m is 2; and (c) from 0 to 90 percent by weight of the oligomer mixture of terminally unsaturated oligomers of the formula:

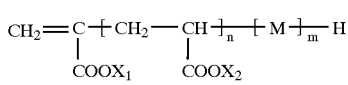

wherein $X_1$ and $X_2$ are independently selected from the group consisting of H, $NH_4$, alkali metals and alkaline earth metals;

wherein M is the residue of a monoethylenically unsaturated monomer;

wherein m is 0 to 5;

wherein n is 3 to 10;

wherein the sum of n and m is less than or equal to 10;

and wherein the sum of (a), (b) and (c) is equal to 100 percent.

In a third aspect of the present invention, there is provided a continuous process for preparing terminally unsaturated oligomers comprising:

(a) forming a reaction mixture comprising
  (i) from 0.5 to 99.95 percent by weight of the reaction mixture of at least one monomer selected from the group consisting of acrylic acid and salts thereof, and acrylic acid and salts thereof in combination with at least one monoethylenically unsaturated monomer;
  (ii) from 0.05 to 25 percent by weight based on the weight of the at least one monomer of at least one free-radical initiator; and
  (iii) optionally, from 0 to 99.5 percent by weight of the reaction mixture of at least one solvent;

(b) continuously passing the reaction mixture through a heated zone wherein the reaction mixture is maintained at a temperature of at least 225° C. for from 0.1 seconds to 300 seconds to form terminally unsaturated oligomers.

In a fourth aspect of the present invention, there is provided a polymer product comprising, as polymerized units, the terminally unsaturated oligomers of the present invention.

In a fifth aspect of the present invention, there is provided a detergent composition comprising the terminally unsaturated oligomers of the present invention.

In a sixth aspect of the present invention, there is provided a detergent composition comprising a polymer product comprising, as polymerized units, the terminally unsaturated oligomers of the present invention.

The acrylic acid used in the process of the present invention can be glacial acrylic acid or a solution of acrylic acid. Furthermore, the acrylic acid can be in the form of a salt such as an alkali metal salt, ammonium salt, alkaline earth metal salt or a combination thereof. Preferably, the acrylic acid is glacial acrylic acid or an aqueous solution of acrylic acid. The acrylic acid is present in the reaction mixture at a level of from 0.5 to 99.95 percent by weight, preferably from 1 to 95 percent by weight, most preferably from 5 to 90 percent by weight.

In addition to the acrylic acid, other monoethylenically unsaturated monomers may be used. Other suitable monoethylenically unsaturated monomers include other $C_3$–$C_6$ monoethylenically unsaturated monocarboxylic acids, and the alkali metal alkaline earth metal and ammonium salts thereof, such as, for example, methacrylic acid, crotonic acid, vinylacetic acid, and acryloxypropionic acid and salts thereof. Other suitable monoethylenically unsaturated monomers include $C_4$–$C_8$ monoethylenically unsaturated dicarboxylic acids and the alkali metal and ammonium salts thereof, and the anhydrides of the cis-dicarboxylic acids; such as, for example, maleic acid, maleic anhydride, itaconic acid, mesaconic acid, fumaric acid, citraconic acid, tetrahydrophthalic anhydrides, cyclohexene dicarboxylic acids and salts thereof. Other suitable monoethylenically unsaturated monomers include acrylamide, t-butylacrylamide, N,N-dimethylacrylamide, and acrylonitrile. Other monoethylenically unsaturated monomers include alkyl esters of acrylic or methacrylic acids such as methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate; acrylamide, methacrylamide, N-tertiarybutylacrylamide, N-methylacrylamide, dimethylaminopropylmethacrylamide; methacrylonitrile, allyl alcohol, allylsulfonic acid, allylphosphonic acid, vinylphosphonic acid, dimethylaminoethyl acrylate, dimethylaminoethyl methacrylate, phosphoethyl methacrylate, N-vinylpyrrolidone, N-vinylformamide, N-vinylimidazole, vinyl acetate, styrene, styrenesulfonic acid and its salts, vinylsulfonic acid and its salts, and 2-acrylamido-2-methylpropanesulfonic acid and its salts. When used, the other monoethylenically unsaturated monomers may be present in the reaction mixture at a level of from 0.05 to 99, preferably from 1 to 95, most preferably from 5 to 90.

The monoethylenically unsaturated monomers which are acids may be in their acid forms or in the form of the alkali metal, alkaline earth metal or ammonium salts of the acid, or a combination thereof. Suitable bases useful for neutralizing the monomer acids include sodium hydroxide, ammonium hydroxide, and potassium hydroxide. The acid monomers may be neutralized to a level of from 0 to 100 percent. Most preferably, the carboxylic acid monomers are used in the unneutralized form, however, partial neutralization of the carboxylic acid monomers may alleviate corrosion on parts of the reaction equipment. The monomers may be neutralized prior to or during the oligomerization reaction. The terminally unsaturated oligomer products are often particularly useful in their partially or completely neutralized form. Partially neutralized terminally unsaturated oligomers, will have the formulae shown above, and in the claims below wherein $X_2$ will be different among the mers of the terminally unsaturated oligomers.

Suitable initiators for the processes of the present invention are any conventional free-radical initiators including, but are not limited to, hydrogen peroxide, certain alkyl hydroperoxides, dialkyl peroxides, peresters, percarbonates, persulfates, peracids, oxygen, ketone peroxides, azo initiators and combinations thereof. Specific examples of some suitable initiators include hydrogen peroxide, oxygen, t-butyl hydroperoxide, di-tertiary butyl peroxide, tertiaryamyl hydroperoxide, methylethyl ketone peroxide and combinations thereof. The initiators are normally used in amounts of from 0.05 percent to 25 percent based on the weight of total polymerizable monomer. A preferred range is from 0.5 to 20 percent by weight of the total polymerizable monomer.

The monomers are preferably polymerized as dilute solutions. The reaction mixture may contain one or more solvents at a level of from 0 to 99.5 percent by weight of the reaction mixture, preferably from 30 to 97 percent by weight of the reaction mixture, and most preferably from 50 to 95 percent by weight of the reaction mixture. As the relative amount of one or more solvents in the reaction mixture decreases, particularly below 60 percent, the molecular weight and the polydispersity (D) of the resulting oligomer mixture increases. Suitable solvents for the process of the present invention are capable of dissolving the one or more monomers and the oligomers formed therefrom. Suitable solvents for the present invention include, for example, water, acetone, methanol, isopropanol, propionic acid, acetic acid, methylethyl ketone, dimethylformamide, dimethylsulfoxide and combinations thereof. Water is the preferred solvent.

In the process of the present invention, the reaction mixture is continuously passed through a heated zone wherein the reaction mixture is maintained at a temperature of at least 225° C. under elevated pressure. Once the reaction mixture is formed, it is preferable to have the passing reaction mixture reach the polymerization temperature as rapidly as possible. Preferably, the reaction mixture reaches the polymerization temperature within 5 minutes, more preferably within 2 minutes, most preferably within I minute. Prior to reaching the reaction temperature, the reaction mixture may be at any suitable temperature, preferably at a temperature of from room temperature to 450° C., most preferably from a temperature of from 60° C. to 400° C. The oligomerization is conducted at a temperature of at least 225° C., and is preferably conducted at a temperature in the range of from 250° C. to 500° C., and most preferably at a temperature in the range of from 275° C. to 450° C. At temperatures below 225° C., the molecular weight of the oligomer increases and the relative amount of by-products, particularly non-terminally unsaturated compounds, increases. The oligomerization at these elevated temperatures is rapid. Thus, the reaction mixture can be maintained at the polymerization temperature for as little as 0.1 seconds, preferably from 0.5 seconds to 5 minutes, most preferably from 1 second to 2 minutes. At extended periods of time at which the reaction mixture is exposed to the polymerization temperature, the yield of terminally unsaturated oligomer decreases. However, extended periods at the polymerization temperature have been found to have little effect on both the conversion of monomer and the molecular weight of the products formed.

The elevated temperatures of the polymerization require that the polymerization reactor be equipped to operate at elevated pressure sufficient to maintain the contents of the reactor as a fluid at the reaction temperature. In general, it is preferred to conduct the polymerization at from 1,000 to 5,000 pounds per square inch (psi), and more preferably at from 3,200 to 4,200 psi.

In the process of the present invention, the one or more monomers, the at least one initiator and, optionally, the one or more solvents are combined to form a reaction mixture. The order of combining the components of the reaction mixture is not critical to the process of the present invention. In one embodiment of the present invention, it may be desirable to use one or more solvents, heat the one or more solvents to an elevated temperature, and add the one or more monomers and the at least one initiator to the heated solvent to form the reaction mixture. It is preferred to add the at least one initiator last. The reaction mixture can be formed at a temperature below, at or above the oligomerzation temperature. In one embodiment of the invention, it may be desirable to add an additional amount of one or more solvents to the oligomer product while the oligomer product is at an elevated temperature to maintain desirable fluidity and viscosity properties of the oligomer product.

The reaction mixture may optionally contain metal ions, such as copper, nickel or iron ions or combinations thereof.

The process of the present invention generally results in a relative conversion of the monomers into oligomer product of from 10 to greater than 95 percent relative to the initial amount of the one or more monomers present in the reaction mixture. If residual monomer levels in the oligomer mixture are unacceptably high for a particular application, their levels can be reduced by any of several techniques known to those skilled in the art. Preferably, any residual monomers which may be present in the oligomer mixture are distilled or "stripped" and recycled for later use.

The process of the present invention results in oligomers having low molecular weights and narrow polydispersities. Furthermore, selected embodiments of the process result in products which do not require the removal of organic solvents and are not contaminated with high levels of salt. The process of the present invention can be used to produce oligomers having number average molecular weights below 5,000, preferably below 3,000, and most preferably from 200 to 1,000. The process of the present invention is useful for producing oligomers of the structural formula shown above wherein the sum of m and n is less than or equal to 50, preferably less than 20, most preferably less than 10.

In a preferred embodiment of the present invention, the oligomer product is predominantly a mixture of terminally unsaturated dimers, terminally unsaturated trimers and terminally unsaturated tetramers. Dimers are oligomeric products of formula (I) wherein the sum of n and m is 1; trimers are oligomeric products of formula (I) wherein the sum of n and m is 2; tetramers are oligomeric products of formula (I) wherein the sum of n and m is 3. The oligomer product preferably contains from 5 to 95 percent of terminally unsaturated dimer, more preferably from 15 to 80 percent of terminally unsaturated dimer based on the total weight of oligomer product in the oligomer mixture. The oligomer product preferably contains from 5 to 95 percent of terminally unsaturated trimer, more preferably from 15 to 80 percent of terminally unsaturated trimer based on the total weight of oligomer product in the oligomer mixture. The oligomer product preferably contains from 0 to 90 percent of terminally unsaturated tetramer, more preferably from 5 to 70 percent of terminally unsaturated tetramer based on the total weight of oligomer product in the oligomer mixture.

The oligomers prepared by the process of the present invention may be used, for example, as additives for detergents, including, for example, powdered laundry detergents, liquid laundry detergents, automatic machine dishwashing detergents, hand dishwashing detergents and cleaners. The oligomers may also be used as water-treatment additives or scale inhibitors. The oligomers may also be used, for example, as dispersants for pigments, minerals, clays, cosmetics, and formulated products such as soaps or agricultural chemical formulations. The oligomers may also be used as a soil humectant to prevent soil from drying and eroding.

When the terminally unsaturated oligomers of the present invention contain, for example, a carboxylic acid group, the oligomers can be re acted with polyfunctional alcohols having two or more alcohol functionalities to form polyesters. Suitable polyfunctional alcohols include, for example, diols, triols and other polyols. Examples of suitable polyfunctional alcohols include, for example, sugars, glycerol, polysaccharides, polyvinyl alcohols), ethylene glycol, propylene glycol, polyethylene glycol) and polypropylene glycol). Preferably, the polyfunctional alcohol is ethylene glycol, sorbitol, sucrose, glucose or a mono-, oligo- or polysaccharide. The reaction of terminally unsaturated oligomers containing carboxylic acid groups with polyfunctional alcohols can be conducted in any suitable manner and is preferably conducted in the presence of an acid catalyst.

Similarly, when the terminally unsaturated oligomers of the present invention contain at least one carboxylic acid group, the at least one carboxylic acid group can undergo a condensation re action with any suitable amine to form a compound which is an amide, polyamide or polyester amide). Also, any suitable amine can undergo a Michael-type addition to the terminally unsaturated moiety of the terminally unsaturated oligomer to form a compound which is a Michael adduct, which may also undergo a reaction to form a compound which is an amide, polyamide or poly (ester amide). Suitable amines, include for example, amino acids, alkylamines, diamines, triamines and alkanolamines. Particular examples of suitable amines include ammonia, methylamine, lysine, ethylenediamine, ethanolamine and Jeffamines sold by Exxon Corp.

Polyesters, amides, polyamides, poly(ester amides) or Michael adduct containing, as reacted units, the terminally unsaturated oligomers, are useful, for example, as additives for detergents, including, for example, powdered laundry detergents, liquid laundry detergents, automatic machine dishwashing detergents, hand dishwashing detergents and cleaners, as water-treatment additives or scale inhibitors, as dispersants for pigments, minerals, clays, cosmetics, and formulated products such as soaps or agricultural chemical formulations.

Because the oligomers are terminally unsaturated, they can also be used, for example, as monomers in a subsequent polymerization, such as in a bulk polymerization, solution polymerization, emulsion polymerization, or suspension polymerization. The terminally unsaturated oligomers can be subsequently polymerized with themselves to form a homopolymer, or with one or more other ethylenically unsaturated monomers to form copolymers. The polymers resulting from the subsequent polymerization of the terminally unsaturated oligomers of the present invention may be useful, for example, in the same applications as the oligomers, or as adhesives, coatings, surfactants, adsorbents, ion-exchange resins and other polymeric applications.

The terminally unsaturated oligomers can also be grafted onto any suitable substrate. Compounds which are suitable substrates are those which contain hydrogen atoms which can be abstracted by a free-radical. Examples of suitable substrates include: polyhydric alcohols such as sugars, glycerol, polysaccharides, and poly(vinyl alcohol); poly (ethylene glycol); poly(propylene glycol); and certain esters such as polycaprolactone. Preferably, the graft substrate is poly(ethylene glycol) (PEG), sorbitol, sucrose, glucose, or other mono-, oligo- or polysaccharide.

THE EQUIPMENT AND GENERAL PROCEDURE

A 10 foot long section of titanium tubing having an inner diameter of 1/16th inch and a wall thickness of 0.050 inch was connected at one end to a high pressure pump (Hewlett Packard Model HP 1050 TI) and at another end to a back-pressure control device. Between the two ends, the section of tubing was coiled about a torus-shaped metal mandrel. The mandrel was situated above a primary coil of a transformer so that the coils of titanium tubing and the mandrel functioned as secondary coils of the transformer. The coils of titanium tubing were further equipped with one end of a temperature probe. The other end of the temperature probe was connected to a temperature controlling device. The temperature controlling device regulated the current supplied to the primary coil of the transformer which had the effect of regulating the heat of inductance imparted to the coiled steel tubing.

A reaction mixture was prepared by mixing solvent, monomer, and initiator. Helium was bubbled through the mixture while stirring.

Deionized water was pumped through the tubing via the high pressure pump at a rate of from 0.05 to 10 milliliters per minute ("ml/min"). The pressure was maintained at a level of from 3300 to 5000 pounds per square inch ("psi"). Current was supplied to the primary coil of the transformer to increase the temperature within the tubing to the desired polymerization temperature. After about 15 minutes, the water being pumped through the tubing was replaced by the reaction mixture which was continuously pumped through the tubing at the same rate, temperature and pressure. After allowing a suitable amount of time for the water to be cleared from the tubing, product was collected as the effluent from the back-pressure control device. When the reaction mixture was nearly gone, deionized water was pumped through the tubing at the same rate, pressure and temperature as the reaction mixture.

The molecular weights referred to are measured by gel permeation chromatography using a polyacrylic acid standard unless specifically stated otherwise. Terminal unsaturation was detected and measured by both $^1$H NMR spectroscopy and $^{13}$C NMR spectroscopy. Conversion was measured as a function of product solids, and was also determined by residual monomer analysis using high pressure liquid chromotagraphy.

EXAMPLES 1–6

Examples 1–6 are oligomerizations conducted according to the general procedure outlined above. The reaction mixture was a 5 percent by weight aqueous solution of glacial acrylic acid and 1 percent by weight based on the weight of glacial acrylic acid of 90 percent by weight tert-butylhydroperoxide. The flow rate was adjusted to provide a residence time of 16 seconds. The polymerization temperature ("Temp."), percent "Conversion" of monomer to oligomer, $M_w$ and $M_n$ appear in below. Analysis of the oligomer product, where formed, indicated that the oligomers were terminally unsaturated oligomers.

TABLE I

| Example | Temp. (° C.) | Conversion (%) | $M_w$ | $M_n$ |
| --- | --- | --- | --- | --- |
| 1 | 250 | 30 | 1356 | 696 |
| 2 | 275 | 40 | 963 | 504 |
| 3 | 300 | 48 | 588 | 390 |
| 4 | 325 | 43 | 479 | 325 |
| 5 | 350 | 41 | 396 | 273 |
| 6 | 375 | 42 | 342 | 235 |

The data in Table I show that terminally unsaturated oligomers were formed in polymerizations conducted at a temperature above 200° C. The data also show that the $M_w$ and $M_n$ decrease as temperature increase.

EXAMPLES 7–14

Examples 7–14 are polymerizations conducted according to the general procedure outlined above using the same conditions as Examples 1–6 except that the initiator was hydrogen peroxide. The polymerization temperature ("Temp."), percent "Conversion" of monomer to oligomer, Mw and Mn appear in Table II below. Analysis of the oligomer product indicated that the oligomers were terminally unsaturated oligomers.

TABLE II

| Example | Temp. (° C.) | Conversion (%) | $M_w$ | $M_n$ |
|---|---|---|---|---|
| 7 | 200 | 8 | >4400 | >3600 |
| 8 | 225 | 11 | 3354 | 2019 |
| 9 | 250 | 17 | 1762 | 986 |
| 10 | 275 | 29 | 1110 | 664 |
| 11 | 300 | 48 | 796 | 520 |
| 12 | 325 | 58 | 641 | 438 |
| 13* | 350 | — | 508 | 339 |
| 14 | 375 | 60 | 439 | 307 |

*The residence time for Example 13 was 45 seconds

The data in Table II show that terminally unsaturated oligomers were formed in polymerizations conducted at a temperature at, and above, 200° C. The data also show that the $M_w$ and $M_n$ decrease as temperature increase and that conversion increases as temperature increases. The data also show that hydrogen peroxide is a initiator.

EXAMPLES 15–24

Examples 15–24 are polymerizations conducted according to the general procedure outlined above using the same conditions as Examples 1–6 except that the residence time was 24 seconds. The initiator type ("Initiator"), polymerization temperature ("Temp."), percent "Conversion" of monomer to oligomer, Mw and Mn appear in Table III below. Analysis of the oligomer product indicated that the oligomers were terminally unsaturated oligomers.

TABLE III

| Example | Initiator | Temp. (° C.) | Conversion (%) | $M_w$ | $M_n$ |
|---|---|---|---|---|---|
| 15 | t-BHP | 350 | 54 | 510 | 358 |
| 16 | $H_2O_2$ | 350 | 68 | 508 | 339 |
| 17 | t-BHP | 375 | 50 | 436 | 327 |
| 18 | $H_2O_2$ | 375 | 60 | 427 | 308 |
| 19 | t-BHP | 390 | 48 | 435 | 317 |
| 20 | $H_2O_2$ | 390 | 56 | 396 | 294 |
| 21 | t-BHP | 410 | 44 | 400 | 307 |
| 22 | $H_2O_2$ | 410 | 44 | 376 | 285 |
| 23 | t-BHP | 425 | 42 | 392 | 301 |
| 24 | $H_2O_2$ | 425 | 40 | 360 | 282 |

The data in Table III show that the Mw and Mn decrease as temperature increases, and that the polymerizations can be conducted at a temperature of at least 425° C,

EXAMPLES 25–41

Examples 25–41 are polymerizations conducted according to the general procedure outlined above using the same conditions as Examples 1–6 except the residence time was 8 seconds the concentration, in percent by weight, of the aqueous acrylic acid solution was the percent shown in Table IV below as "AA Level"; the initiator was at a level shown in Table IV below ("Init. Level" reported as the percent by weight based on the weight of acrylic acid); the temperature for each of the polymerizations shown in Table IV below was 375° C. Analysis of the oligomer product indicated that the oligomers were terminally unsaturated oligomers.

TABLE IV

| Example | AA Level | Init. Level | Conversion (%) | $M_w$ | $M_n$ |
|---|---|---|---|---|---|
| 25 | 5 | 5 | 70 | 611 | 279 |
| 26 | 5 | 3 | 64 | 373 | 223 |
| 27 | 5 | 1 | 43 | 317 | 221 |
| 28 | 15 | 1 | 60 | 954 | 374 |
| 29 | 15 | 3 | 84 | 975 | 360 |
| 30 | 15 | 5 | 89 | 987 | 360 |
| 31 | 30 | 1 | 81 | 1842 | 502 |
| 32 | 30 | 3 | 92 | 1797 | 482 |
| 33 | 30 | 5 | 94 | 1795 | 476 |
| 34 | 50 | 1 | 86 | 2369 | 581 |
| 35 | 50 | 3 | 95 | 2252 | 536 |
| 36 | 50 | 5 | 96 | 2169 | 527 |

EXAMPLES 37–40

Examples 37–40 are polymerizations conducted according to the general procedure outlined above using the same conditions as Examples 1–6 except no initiator was used and the residence time was 46 seconds. The polymerization temperature ("Temp.") and observations appear in Table V, below.

TABLE V

| Example | Temp (° C.) | Observations |
|---|---|---|
| 37 | 250 | no oligomer formation observed |
| 38 | 325 | no oligomer formation observed |
| 39 | 375 | no oligomer formation observed |
| 40 | 425 | no oligomer formation observed |

The data in Table V show that no oligomer was formed in the absence of initiator.

EXAMPLES 41–46

Examples 41–46 are polymerizations conducted according to the general procedure outlined above using the same conditions as Examples 1–6 except the concentration, in percent by weight, of the aqueous acrylic acid solution was 2.5 percent; the reaction mixture contained an equal amount of methacrylic acid (based on the weight of acrylic acid); the tubing was made of stainless steel. The polymerization temperature ("Temp."), the percent of acrylic acid monomer converted to oligomer product (reported as "AA Conversion (%)"), the percent of methacrylic acid monomer converted to oligomer product (reported as "MAA Conversion (%)"), $M_w$ and $M_n$ appear in Table VI below. Analysis of the oligomer products indicated that the oligomers were terminally unsaturated oligomers.

TABLE VI

| Example | Temp. (° C.) | AA Conversion (%) | MAA Conversion (%) | $M_w$ | $M_n$ |
|---|---|---|---|---|---|
| 41 | 250 | 10 | 10 | 2614 | 977 |
| 42 | 275 | 10 | 16 | 1254 | 563 |
| 43 | 300 | 17 | 19 | 738 | 409 |
| 44 | 325 | 22 | 21 | 476 | 326 |
| 45 | 350 | 17 | 19 | 397 | 295 |
| 46 | 375 | 13 | 16 | 327 | 252 |

The data in Table VI show that the process of the invention produced terminally unsaturated oligomers from a mixture of monomers.

EXAMPLES 47–52

Examples 47–52 are polymerizations conducted according to the general procedure outlined above using the same conditions as Examples 1–6 except the concentration, in percent by weight, of the aqueous acrylic acid solution was 2.5 percent; the reaction mixture contained an equal amount of maleic acid (based on the weight of acrylic acid); the tubing was made of stainless steel. The polymerization temperature ("Temp."), the percent of acrylic acid monomer converted to oligomer product (reported as "AA Conversion (%)"), the percent of maleic acid monomer converted to oligomer product (reported as "MAL Conversion (%)"), $M_w$ and $M_n$ appear in Table VII below. Analysis of the oligomer products indicated that the oligomers were terminally unsaturated oligomers.

TABLE VII

| Example | Temp. (° C.) | AA Conversion (%) | MAL Conversion (%) | $M_w$ | $M_n$ |
|---|---|---|---|---|---|
| 47 | 250 | 60 | 58 | 338 | 251 |
| 48 | 275 | 63 | 62 | 384 | 260 |
| 49 | 300 | 58 | 58 | 369 | 250 |
| 50 | 325 | 62 | 62 | 371 | 256 |
| 51 | 350 | 57 | 57 | 363 | 246 |
| 52 | 375 | 60 | 60 | 369 | 247 |

The data in Table VII show that the process of the invention produced terminally unsaturated oligomers from a mixture of monomers.

EXAMPLES 53–60

Examples 53–60 were carried out as follows: A 6 foot long section of stainless steel tubing having an inner diameter of ¹⁄₁₆th inch and a wall thickness of 0.050 inch was connected at one end to a high pressure pump (Hewlett Packard Model HP 1050 TI) and at another end to a back-pressure control device. Between the two ends, the section of tubing was immersed in a temperature-controlled sand bath maintained at 375° C. A reaction mixture was prepared by mixing solvent, monomer, and initiator. Solvent was pumped through the tubing via the high pressure pump at a rate of about 10 ml/min. The pressure was maintained at a level of about 3500 psi. After about 15 minutes, the solvent being pumped through the tubing was replaced by the reaction mixture which was continuously pumped through the tubing at the same rate, temperature and pressure. After allowing a suitable amount of time for the solvent to be cleared from the tubing, product was collected as the effluent from the back-pressure control device.

The reaction mixtures contained various amounts of glacial acrylic acid (reported in Table VIII as "AA%" in percent by weight of acrylic acid based on the reaction mixture) and 1 percent by weight based on the weight of glacial acrylic acid of 90 percent by weight tert-butylhydroperoxide. The reaction mixture also contained various amounts and types of solvents (reported in Table VIII as "Water %" "Other %" in percent by weight of the reaction mixture). The flow rate provided a residence time of 14 seconds. $M_w$ and $M_n$ appear in Table VIII below. Analysis of the oligomer product, where formed, indicated that the oligomers were terminally unsaturated oligomers.

TABLE VIII

| Example | AA % | Solvent Water % | Solvent Other % | $M_w$ | $M_n$ |
|---|---|---|---|---|---|
| 53 | 10 | 90 | 0 | 784 | 533 |
| 54 | 10 | 60 | isopropyl alcohol, 30 | 532 | 377 |
| 55 | 20 | 0 | isopropyl alcohol, 80 | 605 | 343 |
| 56 | 30 | 70 | 0 | 1443 | 620 |
| 57 | 30 | 20 | isopropyl alcohol, 50 | 606 | 418 |
| 58 | 30 | 0 | isopropyl alcohol, 70 | 588 | 355 |
| 59 | 30 | 0 | acetone, 70 | 1087 | 536 |
| 60 | 30 | 0 | methanol, 70 | 576 | 346 |

EXAMPLE 61

The oligomer product obtained from the process similar to the process of Example 27 was chilled in a refrigerator. A crystalline precipitate formed and was collected. Analysis by $^1$H NMR spectroscopy confirmed the identity of the crystalline product as the terminally unsaturated dimer of acrylic acid (2-methylene glutaric acid). A reaction mixture was formed by dissolving 0.432 grams of the terminally unsaturated dimer of acrylic acid and 0.045 grams of ammonium persulfate in 5 milliliters of $D_2O$. The reaction mixture was heated to 80° C. while stirring. Samples of the heated reaction mixture were analyzed by $^1$H NMR spectroscopy to determine the conversion of the terminally unsaturated dimer into higher molecular weight polymer product after 1 hour, 2.5 hours, and 4 hours. The percent of terminally unsaturated dimer converted to higher molecular weight polymer product (reported as "Dimer Conversion (%)"), $M_w$ and $M_n$ of the higher molecular weight polymer product appear in Table IX below.

TABLE IX

| Time | Dimer Conversion (%) | $M_w$ | $M_n$ |
|---|---|---|---|
| 0 hour | 0 | 144 | 144 |
| 1 hour | 73 | n.m.* | n.m. |
| 2.5 hours | 93 | 4659 | 1480 |
| 4 hours | >98 | 4862 | 1960 |

"n.m." is not measured

The data in Table IX show that the terminally unsaturated oligomers can be polymerized to form higher molecular weight polymers.

EXAMPLE 62

The same procedure was followed as in Example 62 except that the terminally unsaturated dimer was converted to the sodium salt with dilute aqueous sodium hydroxide before the polymerization. The data appear in Table X below.

TABLE X

| Time | Dimer Conversion (%) | $M_w$ | $M_n$ |
|---|---|---|---|
| 0 hour | 0 | 144 | 144 |
| 1 hour | 47 | n.m.* | n.m. |
| 2.5 hours | 70 | 836 | 480 |
| 4 hours | 82 | 954 | 612 |

"n.m." is not measured

The data in Table X show that the terminally unsaturated oligomers can be polymerized to form higher molecular weight polymers.

EXAMPLE 63

To a one liter, 4-neck flask equipped with a mechanical stirrer, reflux condenser, thermometer, and inlets for the gradual addition of monomer and initiator solution was added 48.5 grams of deionized water. The contents of the flask were heated to 82° C. while stirring. An initiator solution of 3.1 grams of ammonium persulfate and 20.0 grams of deionized water was prepared. A monomer solution of 30 grams of terminally unsaturated oligomers prepared in a manner similar to Example 27 having $M_w$ of 535 and $M_n$ of 360 dissolved in 30 grams of deionized water was prepared. A neutralizer solution of 99.0 grams of 14.7% by weight aqueous sodium hydroxide was prepared. A solution of 0.5 grams of ammonium persulfate dissolved in 2 grams of water was added to the flask immediately prior to the addition of the monomer, initiator and neutralizer solutions which were added linearly and separately. The neutralizer solution was added over 30 minutes, and the initiator solution and the monomer solution were added over 1.5 hours. Once the addition was complete, the system was kept at 82° C. for 30 minutes. The system was then cooled to ambient temperature.

The solids content of the resulting polymer solution was 20.3%, the $M_w$ was 1980 and the $M_n$ was 1780. The residual terminally unsaturated oligomer was <1% based on the original amount of terminally unsaturated oligomer.

EXAMPLE 64

To a one liter, 4-neck flask equipped with a mechanical stirrer, reflux condenser, thermometer, and inlets for the gradual addition of monomer and initiator solution was added 15.0 grams of deionized water and 15 grams of 1-propanol. The contents of the flask were heated to 82° C. while stirring. An initiator solution of 3.1 grams of ammonium persulfate, 10.0 grams of deionized water and 10.0 grams of 1-propanol was prepared. A monomer solution of 18.55 grams of terminally unsaturated oligomers prepared in a manner similar to Example 27 having Mw of 535 and Mn of 360, 15.2 grams of 2-acrylamidomethylpropanesulfonic acid, and 4.5 grams of t-butylacrylamide dissolved in 18.6 grams of 1-propanol was prepared. A neutralizer solution of 20.8 grams of 50.0% by weight aqueous sodium hydroxide was prepared. A solution of 0.5 grams of ammonium persulfate dissolved in 1 gram of water and 1 gram of 1-propanol was added to the flask immediately prior to the addition of the monomer, initiator and neutralizer solutions which were added linearly and separately. The neutralizer solution was added over 30 minutes, and the initiator solution and the monomer solution were added over 1.5 hours. Once the addition was complete, the system was kept at 82° C. for 30 minutes. The system was then cooled to ambient temperature.

The solids content of the resulting polymer solution was 29.2%, the Mw was 2249 and the Mn was 893. The residual terminally unsaturated oligomer was <1% based on the original amount of terminally unsaturated oligomer.

EXAMPLE 65

To a one liter, 4-neck flask equipped with a mechanical stirrer, reflux condenser, thermometer, and inlets for the gradual addition of monomer and initiator solution was added 20.0 grams of deionized water. The contents of the flask were heated to 82° C. while stirring. An initiator solution of 3.1 grams of ammonium persulfate and 3.9 grams of deionized water was prepared. A monomer solution of 19.5 grams of terminally unsaturated oligomers prepared in a manner similar to Example 27 having $M_w$ of 535 and $M_n$ of 360,10.5 grams of hydroxyethylmethacrylate and 20 grams of deionized water was prepared. A neutralizer solution of 2.2 grams of 30.0% by weight aqueous ammonium hydroxide dissolved in 4.8 grams of deionized water was prepared. A solution of 0.5 grams of ammonium persulfate dissolved in 2 grams of water was added to the flask immediately prior to the addition of the monomer, initiator and neutralizer solutions which were added linearly and separately. The neutralizer solution was added over 30 minutes, and the initiator solution and the monomer solution were added over 1.5 hours. Once the addition was complete, the system was kept at 82° C. for 30 minutes. The system was then cooled to ambient temperature. The contents of the flask were neutralized 13.4 grams of 30% by weight aqueous ammonium hydroxide.

The solids content of the resulting polymer solution was 33.8%, the $M_w$ was 5520 and the $M_n$ was 3590. The residual terminally unsaturated oligomer was <1% based on the original amount of terminally unsaturated oligomer. The residual hydroxyethylmethacrylate was 355 ppm based on the original amount of hydroxyethylmethacrylate.

EXAMPLE 66

To a one liter, 4-neck flask equipped with a mechanical stirrer, reflux condenser, thermometer, and inlets for the gradual addition of monomer and initiator solution was added 35.0 grams of deionized water. The contents of the flask were heated to 80° C. while stirring. An initiator solution of 3.1 grams of ammonium persulfate and 20.0 grams of deionized water was prepared. A monomer solution of 18 grams of terminally unsaturated oligomers prepared in a manner similar to Example 27 having Mw of 535 and Mn of 360, and 26.6 grams of 2-acrylamidomethylpropanesulfonic acid dissolved in 18 grams of deionized water was prepared. A neutralizer solution of 20 grams of 50.0% by weight aqueous sodium hydroxide was prepared. A solution of 0.5 grams of ammonium persulfate dissolved in 2 grams of water was added to the flask immediately prior to the addition of the monomer, initiator and neutralizer solutions which were added linearly and separately. The neutralizer solution was added over 30 minutes, and the initiator solution and the monomer solution were added over 1.5 hours. Once the addition was complete, the system was kept at 80° C. for 30 minutes. The system was then cooled to ambient temperature.

The solids content of the resulting polymer solution was 30.2%, the $M_w$ was 4460 and the $M_n$ was 3810. The residual terminally unsaturated oligomer was <1% based on the original amount of terminally unsaturated oligomer.

EXAMPLE 67

To a 250 milliliter, 4-neck flask equipped with a mechanical stirrer, Dean-Stark condenser, thermometer, and an inlet and an outlet for nitrogen was added 31.7 grams of terminally unsaturated oligomer of acrylic acid (Mw of 490, Mn of 219) and 9.2 grams of ethylene glycol. The flask was immersed in an oil bath maintained at 150° C. while stirring the contents of the flask for 6.5 hours, then allowed to cool to room temperature. To the stirred contents of the flask was added 200 milliliters of deionized water and a sufficient amount of a 50 percent by weight aqueous solution of sodium hydroxide to form a homogeneous solution. The resulting polyester had a $M_w$ of 22300 and $M_n$ of 2030.

EXAMPLE 68

A polyester was prepared in a similar manner as Example 67 except the terminally unsaturated oligomer of acrylic acid had $M_w$ of 228 and $M_n$ of 167; and the flask was immersed in an oil bath maintained at 170° C. while stirring the contents of the flask for 2.0 hours. The resulting polyester had a $M_w$ of 2530 and $M_n$ of 1560.

EXAMPLE 69

A polyester was prepared in a similar manner as Example 68 except the ethylene glycol was replaced with an equimolar amount of poly(ethylene glycol) having $M_w$ of 400. The resulting polyester had a $M_w$ of 2070 and $M_n$ of 391.

EXAMPLE 70

A polyester was prepared in a similar manner as Example 69 except the poly(ethylene glycol) had Mw of 1000. The resulting polyester had a $M_w$ of 2150 and $M_n$ of 403.

EXAMPLE 71

To a 500 milliliter three-neck flask equipped with a mechanical stirrer and reflux condenser was added 100.1 grams of terminally unsaturated oligomer of acrylic acid ($M_w$ of 184, $M_n$ of 139) and 92.5 grams of lysine. The contents of the flask were heated to 150° C. for 1 hour with continuous stirring, then allowed to cool to room temperature. A 10 gram sample was transferred from the flask to a beaker, and the beaker was placed in an oven maintained at 170° C. for 2 hours with manual stirring every 30 minutes. After 2 hours, the beaker was removed from the oven and allowed to cool to room temperature. To the beaker was added, while stirring, 50 milliliters of deionized water and a sufficient amount of a 50 percent by weight aqueous solution of sodium hydroxide to form a homogeneous solution. The resulting polyamide had a $M_w$ of 1780 and $M_n$ of 466.

EXAMPLE 72

A polyamide was prepared in a similar manner as Example 71 except the beaker was placed in an oven maintained at 170° C. for 2.5 hours. The resulting polyamide had a $M_w$ of 6790 and $M_n$ of 886.

EXAMPLE 73

A polyamide was prepared in a similar manner as Example 71 except the beaker was placed in an oven maintained at 170° C. for 3 hours. The resulting polyamide had a $M_w$ of 12,400 and $M_n$ of 962.

EXAMPLE 74

A polyamide was prepared in a similar manner as example 71 except the beaker was placed in an oven maintained at 170° C. for 3.5 hours. The resulting polyamide had a $M_w$ of 36,600 and $M_n$ of 1950.

Liquid Detergent Formulation and Performance Evaluation

The efficacy of the oligomers in a liquid detergent formulation was evaluated by washing soiled cotton fabrics in a prototypical, ultra-heavy duty liquid laundry detergent composition utilizing Sears Kenmore® Ultra Fabric Care brand washing machines (model Heavy Duty 80 Series) set to typical U.S. laundering parameters. Washing conditions are detailed in Table XI below, and the liquid detergent formulation used for the evaluations was that shown in Table XII.

Cotton cloth ("Cotton") was purchased from Test Fabrics, Inc. (Middlesex, N.J.) and cut to a specified size (3½"×4½"). The cloths were then soiled using a China bristle brush (#10) by applying either from 0.7 to 0.8 grams of a 25% clay slurry (in water). The soil was "painted" onto the cloth inside a 2" diameter circle and allowed to air dry overnight prior to laundering. The clays used to soil the cloths were of two types: a) a deep-orange clay (designated "Clay 1" in Table XIII, below), and b) a reddish-brown particulate clay (designated "Clay 2" in Table XIII, below). In addition, cotton cloths pre-soiled with clay (designated "Clay 3" in Table XIII, below), were purchased from Scientific Services (Oakland, N.J.). The clay used by Scientific Services was a brown clay.

Cotton cloths pre-soiled with a dust/sebum mixture, cotton/polyester blend cloths pre-soiled with a dust/sebum mixture ("PE/C"), and polyester cloth ("PE") pre-soiled with a dust/sebum mixture were also purchased from Scientific Services (Oakland, N.J.).

Reflectance of each of the cloths was measured using a Pacific Scientific Colorimeter (Colorgard System 1000) and the data recorded using the X,Y,Z color scale. The reflectance (Y) of the soiled cloths was measured before laundering so that only cloths of the same reflectance were used in a test. Reflectance was then measured after laundering to evaluate the efficacy of the detergent. The Y values reported in Table XIII are the reflectance values obtained after laundering the cloths as described above.

Each of the three clay soils were evaluated with four replicates. The data appearing in Table XIII are composite averages of the reflectance values obtained from all of the clay soils laundered with the builder/adjuvant listed.

TABLE XI

| WASH CONDITIONS | |
| --- | --- |
| APPARATUS | SEARS KENMORE BRAND WASHING MACHINE |
| TEMPERATURE | WARM (95° F.) |
| WATER HARDNESS | MODERATE (200 ppm) |
| AGITATION | HIGH |
| WASH CYCLE | MEDIUM (10 MIN.) |
| WATER CAPACITY | 16.7 GALLONS/LOAD |
| DETERGENT DOSAGE | 100 GRAMS |

TABLE XII

| Component | parts by weight |
| --- | --- |
| Surfactants | |
| Linear Dodecylbenzene Sulfonate | 15.0 |
| Alcohol Ethoxylate (Nonionic) | 9.5 |
| Sodium Alcohol Ethoxysulfate | 5.0 |
| Builder/Adjuvant | |
| Sodium Citrate or oligomer | 12.5 |
| Hydrotrope/Solubilizing Agent | |
| Monoethanolamine | 2.5 |
| Triethanolamine | 2.0 |
| Propylene Glycol | 2.5 |
| Sodium Xylene Sulfonate | 5.0 |

*Misc. and Water up until total formulation is 100 parts.
*Misc. includes perfume, colorants, fatty acids, whiteners and opacifiers.

TABLE XIII

Reflectance Values

| Builder/Adjuvant | Reflectance (Y) | | | Reflectance (Y) Dust/Sebum soils | | |
|---|---|---|---|---|---|---|
| | Clay 1 | Clay 2 | Clay 3 | Cotton | PE/C | PE |
| none | 63.5 | 50.8 | 61.5 | 59.7 | 62.1 | 51.6 |
| oligomer* ($M_w = 270$) | 65.5 | 52.3 | 65.4 | 61.4 | 64.2 | 53.9 |
| oligomer* ($M_w = 370$) | 66.0 | 51.4 | 65.9 | 60.5 | 63.7 | 54.2 |
| citrate | 65.5 | 51.5 | 64.0 | 60.1 | 63.7 | 52.6 |

*terminally unsaturated oligomer of acrylic acid prepared in a similar manner as Example 6.

These results demonstrate that the terminally unsaturated oligomers produced by the present invention are effective as additives, and potential partial or complete replacements for citrate, in liquid laundry detergents.

Powder Detergent Formulation and Performance Evaluation

The efficacy of the oligomers and polymers containing the oligomers as polymerized units were evaluated in a powder detergent formulation by washing soiled cotton and cotton/terry blended fabrics in a prototypical, powdered laundry detergent composition shown in Table XV, below. Cloths were stained in the manner described above. The clay used to soil the cloths was a reddish-brown particulate clay.

The detergent compositions were tested in a Terg-o-Tometer at the following conditions; 40° C., 100 rpm, 100 ppm hardness (50% city tap water/50% de-ionized water), 12 minute wash with one 3 minute rinse, 1300 ppm detergent and 5 cloths per pot (3 of them soiled). The wash water was pre-heated, the fabric swatches were added and then dissolved detergent (2.6 grams of a 50% slurry in 100 milliliters water) was added. Following the wash period the swatches were wrung, and following the rinse cycle the swatches were wrung again and then air dried. Swatches washed in a detergent containing no polymer or oligomer were always run as a control.

Reflectance was measured using a Pacific Scientific Colorimeter (Colorgard System 1000) and the data recorded using the L,a,b color scale. Detergency values (E), a measure of soil removal, and whiteness index (W.I.), a measure of anti-redeposition, are calculated as:

$$E=((L_s-L)^2+(a_s-a)^2+(b_s-b)^2)^{0.5}$$

$$W.I.=(L/100)*(L-(5.715*b))$$

where $L_s$, $a_s$, and $b_s$ are the reflectivity reading for the soiled swatches and L,a,b are the reflectivity readings for the washed swatches. Each polymer was evaluated in three separate washing experiments. The detergent composition and levels of the components in parts by weight ("pbw") are shown in Table XV. This composition was used for the above described performance evaluation and the results of the detergent performance evaluation are listed in Table XVI. The reflectance of the soiled cloths was measured before laundering so that only cloths of the same reflectance were used in a test. Reflectance was then measured after laundering to evaluate the efficacy of the polymer in the detergent. The values reported in Table XVI are the average of the change in detergency and whiteness index of three cloths relative to the control cloths laundered in detergent not containing polymer. Positive numbers indicate an increase in detergency or whiteness index.

TABLE XIV

WASH CONDITIONS

| | |
|---|---|
| APPARATUS | Terg-o-tometer washing machine |
| AGITATION | 100 revolutions per minute |
| TEMPERATURE | 40° C. |
| WATER HARDNESS | 100 parts per million ("ppm") |
| WASH CYCLE | 12 minutes |
| RINSE CYCLE | 3 minutes |
| WATER LEVEL | 1 liter |
| DETERGENT DOSAGE | 1,300 ppm |
| BALLAST | 5 cloths per load (3 soiled/2 unsoiled) |

TABLE XV

Experimental Powdered Detergent Composition

| Detergent Component | pbw |
|---|---|
| sodium carbonate | 40.0 |
| zeolite A | 28.2 |
| sodium silicate | 4.9 |
| LAS | 7.4 |
| lauryl sulfate | 14.5 |
| oligomer, polymer, polyester or polyamide | 0 or 5.0 |

TABLE XVI

| Product of Example # | Detergency (E) | Whiteness Index |
|---|---|---|
| none | 0 | 0 |
| 67* | 2.4 | 16.6 |
| 67 | 3.6 | 25.7 |
| 68* | 1.1 | 11.8 |
| 68 | 2.6 | 14.4 |
| 69 | 1.8 | 18.2 |
| 70 | 1.2 | 11.3 |
| 71* | 1.1 | 11.8 |
| 71 | 2.8 | 17.9 |
| 72 | 3.4 | 27.8 |
| 73 | 2.2 | 15.5 |
| 74 | 2.7 | 22.0 |

*The oligomer starting material was tested.

Test of Terminally Unsaturated Oligomers as Inorganic Pigment Dispersants

EXAMPLES 75 and 76

The slurries appearing in Table XVII, below, were made in the following way: 0.842 grams of dispersant and 0.689 grams of sodium carbonate were added to deionized water and diluted with additional deionized water to 210.0 grams. This mixture was stirred with a spatula until it was completely mixed. Then, 490.0 grams of dried clay was added to the mixture and the mixture was stirred at high speed on a Waring blender for five minutes to provide a 70 percent by weight dispersed slurry of clay with a "Dispersant Level" of 0.172 percent by weight based on the weight of clay. The viscosity of the slurry was then measured at 23° C. using a Brookfield viscometer, model RVT, spindle #2 at 20 rpm (reported in Table XVII as "Initial Viscosity" in centipoises ("cps")). The slurry was then allowed to stand for 2 weeks at 70° C. and the viscosity was measured in the same manner (reported in Table XVII as "Heated Aged Viscosity" in cps).

EXAMPLES 77 and 78

Slurries were prepared in a similar manner as Examples 75 and 76 except 0.876 grams of dispersant and 0.717 grams of sodium carbonate were used to provide a slurry of clay with a Dispersant Level of 0.178 percent by weight based on the weight of clay.

In Table XVII, below, Dispersant Type A is the sodium salt of a terminally unsaturated oligomer of acrylic acid having $M_w$ of 1076, and Dispersant Type B is the sodium salt of a homopolymer of acrylic acid having $M_w$ of 1,000.

TABLE XVII

| Example | Dispersant Type | Dispersant Level | Initial Viscosity (cps) | Heat Aged Viscosity (cps) |
|---------|-----------------|------------------|-------------------------|---------------------------|
| 75 | A | 0.172 | 410 | 1090 |
| 76 | B | 0.172 | 482 | 1440 |
| 77 | A | 0.178 | 484 | 790 |
| 78 | B | 0.178 | 920 | 1830 |

The data in Table XVII show that terminally unsaturated oligomers are effective as dispersants of inorganic pigments as shown by the lower viscosities of slurries containing them relative to slurries containing known polymeric dispersants, both immediately after the dispersed slurry is prepared and after the slurry has been heated and aged.

We claim:

1. A detergent composition comprising a terminally unsaturated oligomer of the formula:

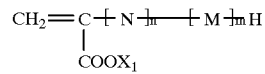
(I)

wherein N is a residue of the formula

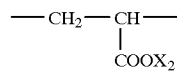

wherein $X_1$ and $X_2$ are independently selected from the group consisting of H, $NH_4$, alkali metals and alkaline earth metals;

wherein M is the residue of a monoethylenically unsaturated monomer;

wherein m is 0 to 47;

wherein n is 2 to 50;

and wherein the sum of n and m is less than or equal to 50.

2. A detergent composition comprising a polymer comprising, as polymerized units, a terminally unsaturated oligomer of the formula:

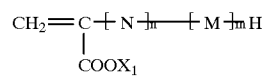
(I)

wherein N is a residue of the formula

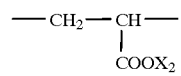

wherein $X_1$ and $X_2$ are independently selected from the group consisting of H, $NH_4$, alkali metals and alkaline earth metals;

wherein M is the residue of a monoethylenically unsaturated monomer;

wherein m is 0 to 47;

wherein n is 2 to 50;

and wherein the sum of n and m is less than or equal to 50.

3. A dispersant composition comprising a terminally unsaturated oligomer of the formula:

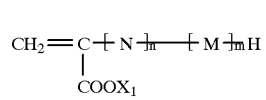
(I)

wherein N is a residue of the formula

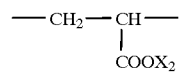

wherein $X_1$ and $X_2$ are independently selected from the group consisting of H, $NH_4$, alkali metals and alkaline earth metals;

wherein M is the residue of a monoethylenically unsaturated monomer;

wherein m is 0 to 47;

wherein n is 2 to 50;

and wherein the sum of n and m is less than or equal to 50.

4. A dispersant composition comprising a polymer comprising, as polymerized units, a terminally unsaturated oligomer of the formula:

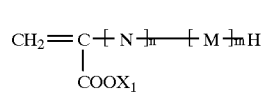
(I)

wherein N is a residue of the formula

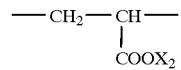

wherein $X_1$ and $X_2$ are independently selected from the group consisting of H, $NH_4$, alkali metals and alkaline earth metals;

wherein M is the residue of a monoethylenically unsaturated monomer;

wherein m is 0 to 47;

wherein n is 2 to 50;

and wherein the sum of n and m is less than or equal to 50.

* * * * *